Patented June 20, 1944

2,351,637

UNITED STATES PATENT OFFICE 2,351,637

TETRACYCLIC KETONES

Leopold Ruzicka and Moses Wolf Goldberg, Zurich, Switzerland, assignors to Ciba Pharmaceutical Products, Incorporated, Summit, N. J., a corporation of New Jersey No Drawing. Application February 4, 1941, Serial No. 377,402. In Switzerland March 14, 1940

6 Claims. (Cl. 260—586)

It has been found that new tetracyclic ketones are obtained if saturated or unsaturated secondary alcohols of the ring-homo or ring-nor steroid series are treated with oxidizing agents.

As parent materials may be used all tetracyclic secondary alcohols which are annulated in the manner of steroids and which may be derived from cyclopentanopolyhydrophenanthrene compounds by ring extension (ring-homo compounds) or by ring contraction (ring-nor compounds) of one or several of the 4 rings. In addition to the secondary alcohol grouping, they can, of course, contain any other desired substituents, such as, generally, esterified and etherified hydroxyl groups, free tertiary and primary hydroxyl groups, substituted and unsubstituted hydrocarbon radicals, such as alkyl, alkenyl, alkinyl, alkylene, acyl or ketol groups, also keto groups—which may be present also in the form of their enol derivatives—cyanogen, free and substituted carboxyl, amino or thiol groups. Suitable parent materials are available, for example, from the cyclopentanopolyhydrophenanthrene compounds by ring extension and/or ring contraction, by total synthesis as well as, if desired, by the subsequent application of methods of themselves known for the conversion, introduction or elimination of substituents and/or multiple bonds.

For the oxidation or dehydrogenation use may be made of all the chemical, biochemical or electrochemical methods suitable for the conversion of secondary alcohols into ketones and in particular of those which are used in the steroid series. During this process, if desired, oxidizable substituents or multiple bonds which may be present may be protected intermediately by known methods.

Among the ketones obtainable by the invention are compounds possessing high sexual or suprarenal cortical hormone activity.

Example 1

4 parts of 3-hydroxy-17a-benzoxy-D-homo-androstane (prepared, for example, by reduction of t-dehydro-androsterone-acetate-cyanhydrin, action of nitrous acid, reduction of the keto group newly formed by ring extension, benzoylation, and partial saponification of the ester group in the 3-position) are dissolved in 200 parts of glacial acetic acid stable to chromic acid; a solution of 1 part of chromic oxide in 10 parts of glacial acetic acid of 90% strength is added and the reaction mixture is allowed to stand for 16 hours at room temperature. It is then poured into water and the crystalline mass which forms is filtered off by suction, washed with water and recrystallized from methanol. In this manner, 3-keto-17a-benzoxy-D-homo-androstane of the probable formula

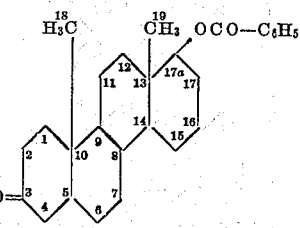

is obtained.

If other diole-17a-mono-esters or ethers are used as starting materials, for example, the acetate, propionate or butyrate, analogous oxyketone esters or ethers are obtained.

If a $\Delta^5$-3,17a-dihydroxy-D-homo-androstene-17a-mono-ester (prepared by Curtius' degradation of $\Delta^5$-3-acetoxy-pregnene-21-acid to the amine, diazotization, benzoylation of the carbinol group newly formed by ring extension, and partial saponification of the group in the 3-position) be used as parent material, corresponding $\Delta^4$-3-keto-17a-hydroxy-D-homo-androstene esters are obtained. When chromic acid is used here as oxidizing agent, an intermediate protection of the double bond, for example, by means of halogen or hydrogen halide, is advantageous.

On the other hand, protection of the double bond is superfluous if oxidation is carried out by means of a ketone in the presence of a metal alcoholate or phenolate, by heating with a metal, such as copper, in vacuo, by tritylation and thermic elimination of triarylmethane, or by biochemical or electrochemical methods.

In an analogous manner, from saturated and unsaturated 3,17a - dihydroxy - D - homo-androstanes, 3-hydroxy-17a-keto-D-homo-androstanes and 3-keto-17a-hydroxy - D - homo-androstanes, saturated and unsaturated 3,17a-diketo-D-homo-androstanes are obtained. The first-named dihydroxy compounds may also be partially oxidized, for example, according to the method of exchange of oxidation stages, to saturated and unsaturated 3-keto-17a-hydroxy-D-homo-androstanes.

Finally, in the same manner, ketones may be prepared of other tetracyclic ring systems, for example, derived from nuclear saturated and unsaturated A - nor - androstane, A-homo-androstane, A-nor-D-homo-androstane, A-homo-D-homo-androstane or -pregnane compounds, or from homo-oestrane compounds.

Example 2

100 parts of absolute toluene and 10 parts of cyclohexanone are added to 1 part of $\Delta^5$-3,17a-dihydroxy-17a-methyl-D-homo-androstene (prepared, for example, by reduction of a $\Delta^5$-3,17-dihydroxy-etio-cholenic acid ester with sodium and alcohol, elimination of water, for example, by means of formic acid, addition of 2 hydroxyl groups at the two-fold unsaturated compounds formed with ring extension, and elimination of water by means of potassium bisulphate. The $\Delta^5$-3-hydroxy-17a-keto-D-homo-androstene obtained is finally reacted with a methyl-magnesium-halide). The reaction mixture is distilled in vacuo until 10 parts of the solvent mixture has been removed, and 1 part of aluminium tertiary butylate is added to the residue. The whole is heated for 1½ hours at the boil under reflux. It is now distilled with steam for 3 hours, when the residue is acidified and extracted with ether. On evaporation of the ethereal solution, crude $\Delta^4$-3-keto-17a-hydroxy-17a-methyl-D-homo-androstene of the probable formula

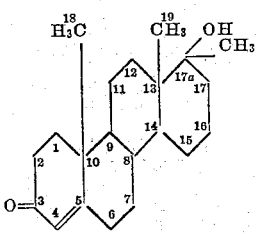

is obtained, which may be further purified by recrystallization from ethyl acetate.

In a completely analogous manner the corresponding nuclear saturated compound is obtained; further the nuclear saturated or nuclear unsaturated compounds which contain, for example, the substituents

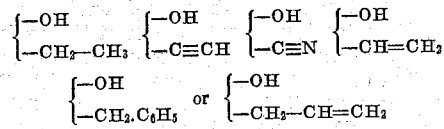

in the 17a-position. The necessary parent materials are to be obtained, for example, from $\Delta^5$-3-hydroxy-17a-keto-D-homo-androstene or 3-hy-hydroxy-17a-keto-D-homo-androstane by the action of the alkyl, alkenyl or alkinyl magnesium halide concerned, by partial reduction of the condensation products obtained with the latter compounds, or by the action of hydrocyanic acid. The hydroxyl group in 17a-position may also be present in form of a substituent convertible into hydroxyl by the aid of hydrolyzing agents, for instance in form of an esterified or etherified hydroxyl such as an acyloxy group or a halogen atom, or may be replaced by hydrogen.

Example 3

1 part of $\Delta^5$-3-hydroxy-17a-acetyl-D-homo-androstene (obtained, for example, from $\Delta^5$-3-acetoxy-17a-keto-D-homo-androstene by addition of hydrocyanic acid, elimination of water by phosphorus oxychloride in quinoline, reacting the doubly unsaturated nitrile with methyl magnesium iodide, and partial reduction) is dissolved in 60 parts of benzene, and the reaction solution is distilled to remove water until 10 parts of the solvent have been removed. 10 parts of acetone and 1 part of aluminium isopropylate are now added, and the reaction mixture is heated for 20 hours at the boil under reflux. It is now distilled for 1 hour with steam, when the residue is acidified and extracted with ether. After evaporation of the ether solution and recrystallization of the residue from acetone, $\Delta^4$-3-keto-17a-acetyl-D-homo-androstene ($\Delta^4$-3,20-diketo-D-homo-pregnene) of the probable formula

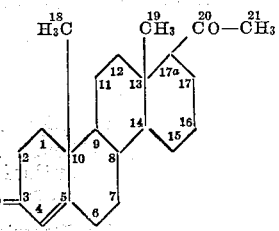

is obtained. The same compound is also obtained when $\Delta^5$-3,20-dihydroxy-D-homo-pregnene or $\Delta^4$-3-keto-20-hydroxy-D-homo-pregnene is used as parent material, an oxyalkyl group being thus present in 17a-position of the nucleus. If, in place of acetone, a quinone be used as hydrogen acceptor, then the first two parent materials yield $\Delta^{4,6}$-3,20-diketo-D-homo-pregnadiene.

If a $\Delta^5$-3-hydroxy-20-keto-21-acyloxy-D-homo-pregnene (preparable analogously to the 21-desoxy compound, but by hydrolysis of the doubly unsaturated nitrile obtained as intermediate product, instead of the Grignard reaction, and by finally building up the D-homo-etio-acid obtained to the ketol) be used as parent material, then a $\Delta^4$-3,20-diketo-21-acyloxy-D-homo-pregnene is obtained, which probably possesses the formula

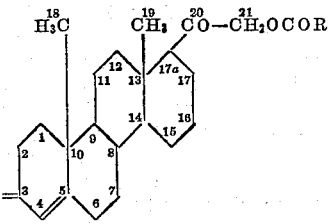

In place of using the oxidation method mentioned with a ketone in the presence of an aluminium alcoholate, it is possible here to make use, for example, of chromic acid as oxidizing agent, with intermediate protection of the double bond.

Analogously there are obtained the corresponding derivatives containing in 17a-position besides the acyl, ketol-ester or hydroxy-alkyl group a hydroxyl or a radical convertible into hydroxyl by the aid of hydrolyzing agents. Also derivatives containing in other positions, for example in 6, 7, 11 or 12 position, additional substituents like oxo, hydroxy or acyloxy groups are available in the same manner.

What we claim is:
1. A member of the group consisting of nuclear saturated and 4,5-unsaturated 3-ketones derived from the ring D-homo-steroids and containing as further substituent at the 17a-position in ring D the grouping

wherein R is a member of the group consisting of alkyl, alkenyl, alkinyl, acyl, and ketol-ester group and x stands for a member of the group consisting of hydrogen, hydroxyl and a radical convertible into hydroxyl by the aid of hydrolyzing agents.

2. A member of the group consisting of nuclear saturated and 4:5 unsaturated 3,20-diketo-17a-hydrogen-ring D-homo-pregnanes.

3. A member of the group consisting of nuclear saturated and 4:5 unsaturated, acylated 3,20-diketo-17a-hydrogen - 21 - hydroxy - ring D-homo-pregnanes.

4. A member of the group consisting of nuclear saturated and 4:5 unsaturated 3-keto-17a-hydroxy-17a-methyl-ring D-homo-androstanes.

5. A member of the group consisting of nuclear saturated and 4:5 unsaturated 3-keto-17a-hydroxy-17a-ethinyl-ring D-homo-androstanes.

6. A member of the group consisting of nuclear saturated and 4:5 unsaturated 3-keto-17a-hydroxy-17-R-ring-homo-androstanes wherein R is a member of the group consisting of alkyl, alkenyl, alkinyl, acyl and ketol-ester groups.

LEOPOLD RUZICKA.
MOSES WOLF GOLDBERG.